US006965828B2

United States Patent
Pollard

(10) Patent No.: US 6,965,828 B2
(45) Date of Patent: Nov. 15, 2005

(54) IMAGE-BASED COMPUTER INTERFACE

(75) Inventor: Stephen Bernard Pollard, Uley Nr Dursley (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 47 days.

(21) Appl. No.: 10/387,127

(22) Filed: Mar. 13, 2003

(65) Prior Publication Data
US 2004/0010367 A1    Jan. 15, 2004

(30) Foreign Application Priority Data
Mar. 13, 2002  (GB) ................................ 0205876

(51) Int. Cl.[7] ............................................. G01C 21/36
(52) U.S. Cl. .................. 701/213; 701/208; 701/211; 701/212; 340/988
(58) Field of Search ............................. 701/200, 208, 701/211–212, 213–214, 300; 342/357.01, 342/357.08, 357.09; 340/988–991

(56) References Cited

U.S. PATENT DOCUMENTS

| 5,867,110 A | 2/1999 | Naito et al. ............. 340/286.05 |
| 6,169,552 B1 * | 1/2001 | Endo et al. .................. 345/427 |
| 2002/0001032 A1 | 1/2002 | Ohki |
| 2002/0032510 A1 * | 3/2002 | Turnbull et al. .............. 701/49 |

FOREIGN PATENT DOCUMENTS

EP    0 650 125 A1    4/1995

OTHER PUBLICATIONS

Pradhan et al., "Websigns: Hyperlinking Physical Locations to the Web", IEEE, Aug., 2001, pp. 42-48.

* cited by examiner

Primary Examiner—Gertrude A. Jeanglaude

(57) ABSTRACT

A mobile computing device has a touch sensitive display screen for displaying an image including a pictorial representation of a location. A user supplies a request to the device for information relating to parts of the location shown in the pictorial representation. A GPS system and compass in the device produce data relating to the current position and current orientation of the device. A controller of the device responds to the data to select the pictorial representation.

43 Claims, 5 Drawing Sheets

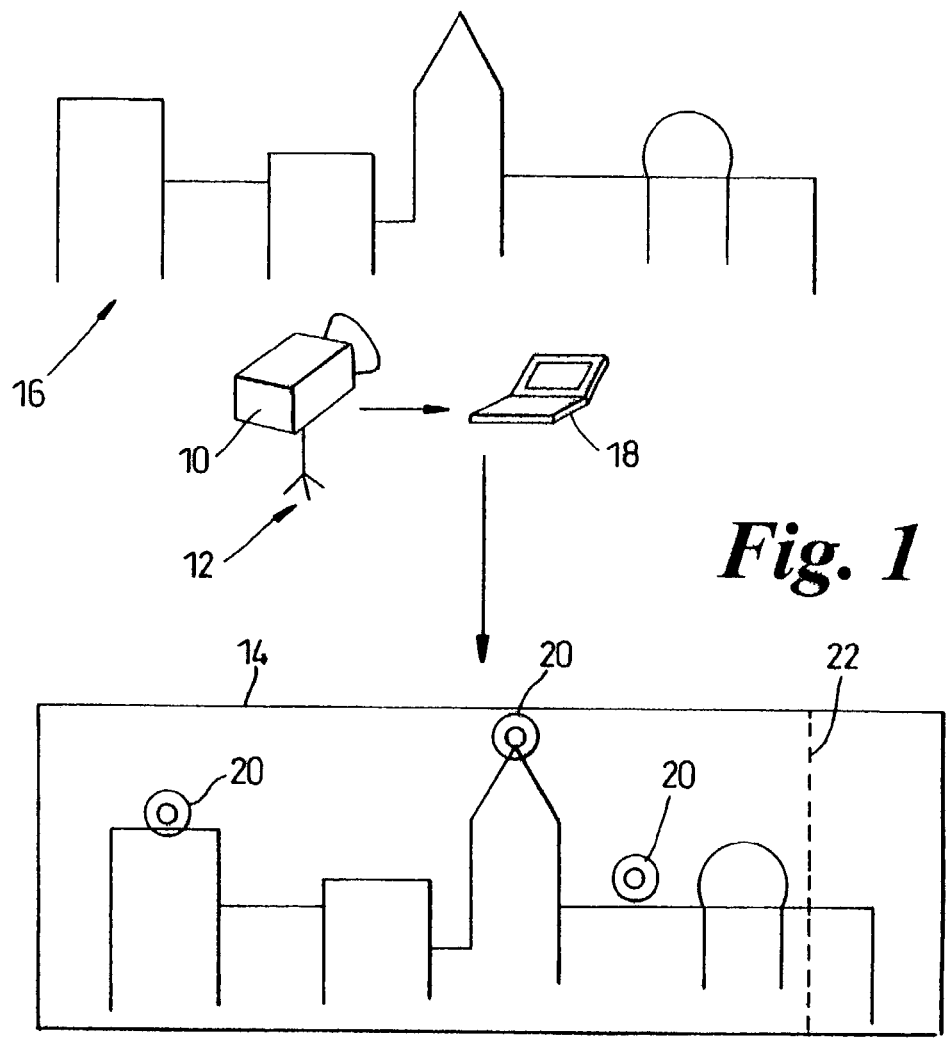
Fig. 1
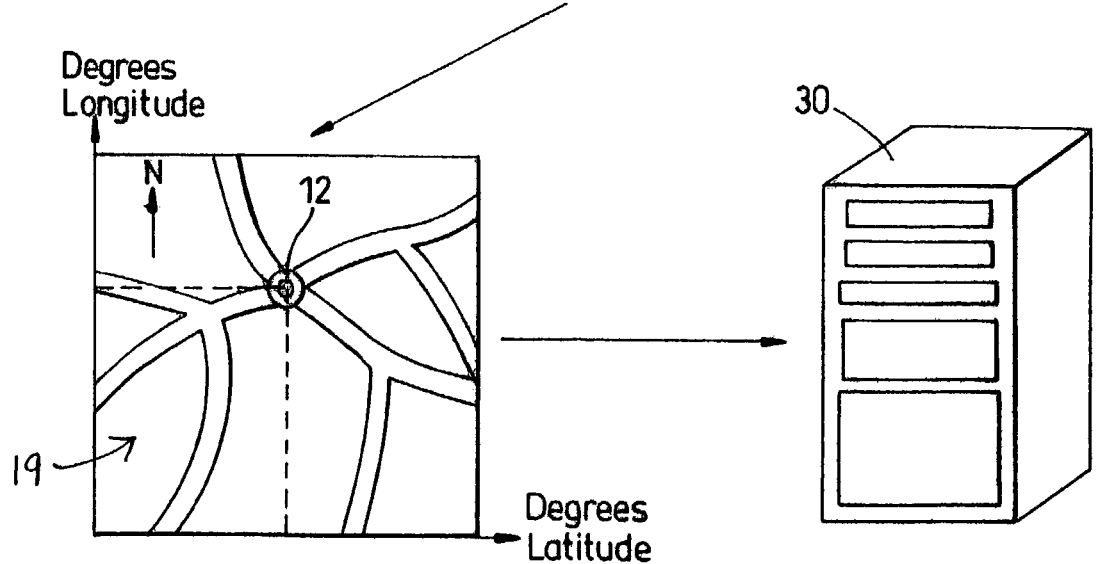

IMAGE-BASED COMPUTER INTERFACE

FIELD OF INVENTION

The present invention relates to the use of image based interfaces to give a user of a mobile computing device access to information relating to his environment.

BACKGROUND ART

It is known to arrange a mobile computing device, such as a personal digital assistant (PDA), so that it can display information relevant to its current environment. For example the article Websigns: Hyperlinking Physical Locations to the Web: Pradhan et al, IEEE Computer Magazine, August 2001, pp. 42–48 discloses a system which links physical entities in the environment to information and resources available on the web. This is done by a system of virtual tags and beacons which are essentially recorded as map references (for tags) and map references and compass bearings (for beacons). When a mobile device is pointed at a position in the real world corresponding to one of these virtual tags or beacons, the pointed-at position is determined by a GPS locating system and digital compass in the device. The device offers the user a link to a web site containing information, or providing services, relevant to that position.

SUMMARY OF INVENTION

The present invention provides a mobile computing device comprising a controller, display arranged to provide a displayed image including a pictorial representation of at least a part of a view of a location, an input device for allowing a user to request information relating to the location, and a locator arrangement for producing data relating to at least one of a current position and a current orientation of the device, wherein the controller is arranged to receive the data and to select the displayed image at least partly on the basis of the data.

Although this invention can be used with all forms of mobile computing device it will be appreciated that it is most suitable for portable computing devices which are likely to be carried by a user to a number of locations, and in particular hand held computing devices such as PDAs.

The locator can conveniently be a global positioning satellite (GPS) system. However other methods of locating the device are also possible, for example by detecting signals from terrestrial radio transmitters in known locations or by manual entry of the position of the mobile computing device. Any of these systems may also be sufficient to enable determination of the orientation of the device, or if a higher degree of accuracy is required a compass can be included in the device. If the computing device is intended for use indoors, then a more suitable system such as an ultrasonic locating system can be used, either alone or in combination with the GPS system. For even closer range systems a magnetic locating system can be used.

An input device preferably enables the user to interact with the image to request desired information. For example, the input device can include a touch sensitive screen on which the pictorial representation is displayed, or a cursor and cursor control input, such as a keyboard, mouse, roller ball or touch sensitive pad. Alternatively the input device could use some other mechanism for the user to identify the area of the image he is interested in, for example, by labelling various areas with reference numerals or letters which can be derived from a keyboard to select the area of interest.

Preferably, the input device is arranged to enable the user to provide a user input, and the controller is arranged to select the displayed pictorial representation at least partly on the basis of the user input. This function of the input device can be achieved by the same user interface as that arranged to allow the user to request the information, or it can use a separate interface. The input device can therefore include any suitable form of interface for this purpose such as, for example, a keypad, a mouse, a roller ball, a joystick, or a touch sensitive pad or screen.

According to a second aspect of the invention, a mobile computing device comprises a controller, a display arranged to provide a displayed image including a pictorial representation of at least a part of a view of a location, a user input for allowing a user to request information relating to the location, and a data generator for producing data relating to at least one of a current position and a current orientation of the device wherein the controller is arranged to receive the data and to select the displayed pictorial representation at least partly on the basis of the data.

According to a third aspect of the invention, a method of storing data representing a view of a location comprises the steps of recording a pictorial representation of the view, associating with the pictorial representation an indicator of at least one of a location and a direction of the view, and associating with a part of the pictorial representation a link to information relating to a part of the location corresponding to said part of the pictorial representation.

A fourth aspect of the invention relates to a file server comprising a memory storing data according to the second aspect of the invention and a communications port for enabling remote retrieval of said data.

According to a fifth aspect of the invention, a method of providing information to a user via a mobile computing device comprises receiving data relating to at least one of a current position and a current orientation of the device, selecting a pictorial representation of a view of a location at least partly on the basis of said data, and presenting the pictorial representation to the user on the device, together with at least one link to information relating to the location.

According to a sixth aspect of the invention, a computer readable medium carries instructions which, when run on a computing device, cause the computing device to perform the method of the fifth aspect of the invention.

According to a seventh aspect of the invention, a computer readable medium carries data stored according to the method of storing data of the invention.

BRIEF DESCRIPTION OF THE DRAWING

Preferred embodiments of the present invention are now described by way of example only with reference to the accompanying drawings in which:

FIG. 1 is a schematic diagram of a method of and apparatus for storing data representing images according to one embodiment of the invention;

DETAILED DESCRIPTION OF THE DRAWING

Figure 2:
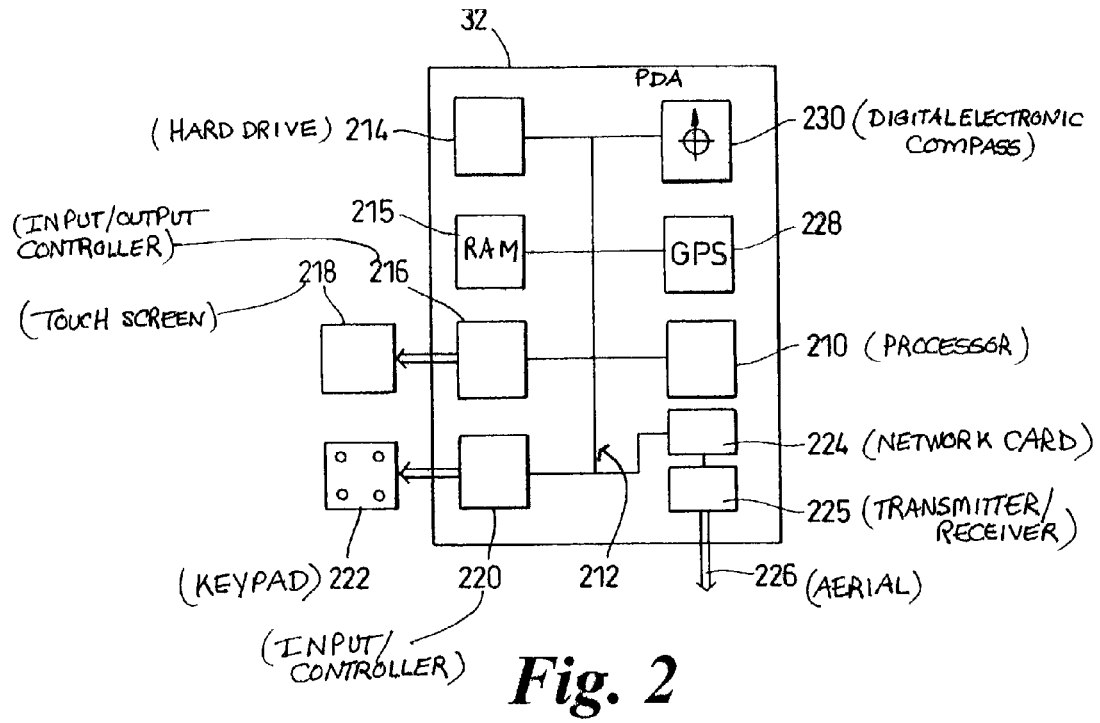
FIG. 2 is a schematic view of a computing device according to a second embodiment of the invention.

Referring to FIG. 1, in order to set up a system according to an embodiment of the invention it is first necessary to record a number of images that are pictorial representations of views of the environment and store them so that they can be accessed by a user. Firstly, therefore, a number of locations are chosen of which corresponding panorama views are to be stored and made available. Then for each location a camera 10 is placed in a chosen viewing position 12 and used to record an image 14 that is a pictorial representation of the location 16. This is done using a standard tool such as PhotoVista Panorama, available from MGI. The image could have a relatively narrow field of view, but in this embodiment it is a full 360° panorama image produced by rotating the camera 10 through 360° in the horizontal plane. The image 14 is then supplied as an input to a computer 18, typically a laptop or other mobile device, for processing.

A number of 'hot spots' 20 are embedded in the image 14 using a suitable tool such as Reality Studio, also available from MGI. These hot spots 20 are in the form of visible markers at fixed points in the image 14; hot spots 20 can be selected by the user. Each hot spot 20 associates its respective position in the image 14 with a link to further information, and enables the user to access information relevant to a particular part of the image by selecting it. Some of the links are to web sites which provide information and services relevant to the specific object or location, in the real world, associated with the hot spot. Others links are to information files stored locally on the mobile device comprised of computer 18.

Then a positional indicator identifying the location of the viewing position associated with the image 18 is attached to the image, in this case the positional indicator is in the form of a map reference 19 including a latitude and longitude of the viewing position 12. Also a directional indicator 22 is located in a particular part of the image to identify the viewing direction of that part of the image and of the corresponding part of the view. The exact nature of the directional indicator depends on the nature of the image. However, the directional indicator needs to be sufficient to define the viewing direction absolutely, for example in terms of altitude and azimuth angles. For a full 360° panorama about a vertical panorama axis, in which the distribution of bearing through the image is constant, a single compass bearing associated with one part of the image is sufficient to enable a computer device displaying the image to determine the viewing direction, for example as a compass bearing, associated with any part of the image. In this example a vertical line 22 in the image is identified as corresponding to a particular viewing direction, such as magnetic North. However for a similar panorama of less than 360° the viewing directions, or compass bearings, associated with the two or more points in the image, for example the two ends of the image, might be needed. For more schematic images where the distribution of bearing through the image is not constant, the directional indicators stored in the image must be sufficient to indicate what range of compass bearings is associated with any portion of the image.

If the panorama recording process includes the possibility of a non-vertical panorama axis, i.e. the camera recording the panorama can move out of the horizontal plane, the directional indicator in the image needs to identify fully the viewing direction of at least one part of the image, for example in terms of both altitude and azimuth angles, to enable the viewing direction of each part of the image to be determined.

Finally the marked up image is stored on an http server 30. When this process is repeated for all the views of interest, the server 30 contains a library of marked up images of all of those views, each having associated with it a specific viewing position and a viewing direction or range of viewing directions.

Referring to FIG. 2 the information stored on the server 30 is accessed using a portable computing device in the form of a hand-held personal digital assistant (PDA) 32. In one preferred embodiment, the PDA is based on a Hewlett Packard Jornada 568. PDA 32 comprises a processor 210 connected via a bus 212 to hard drive 214, a random access memory (RAM) 215, an input/output controller 216 connected to a first user interface in the form of a touch sensitive display screen 218, and a further input controller 220 connected to a second user interface in the form of a keypad 222. Also connected to the bus 212 are a network card 224 which is also connected via a transmitter/receiver circuit 225 to an aerial 226, a GPS system 228 arranged to receive signals from GPS satellites and generate therefrom positional data indicating the current position of the PDA, and a digital electronic compass 230 arranged to produce data indicative of the current orientation of the PDA. The GPS system is preferably in the form of a TU70-D100 GPS sensor board from Conexant Systems Inc of Newport Beach Calif. The electronic compass is preferably in the form of a Vector 2XG 2 axis compass module from Precision Navigation Inc. of Santa Rosa Calif. The network card, which provides wireless network connectivity, is preferably a compact flash wireless network card in the form of a Spectrum 24 High Rate card from Symbol Technologies Inc of Holtsville N.Y.

Figure 3:
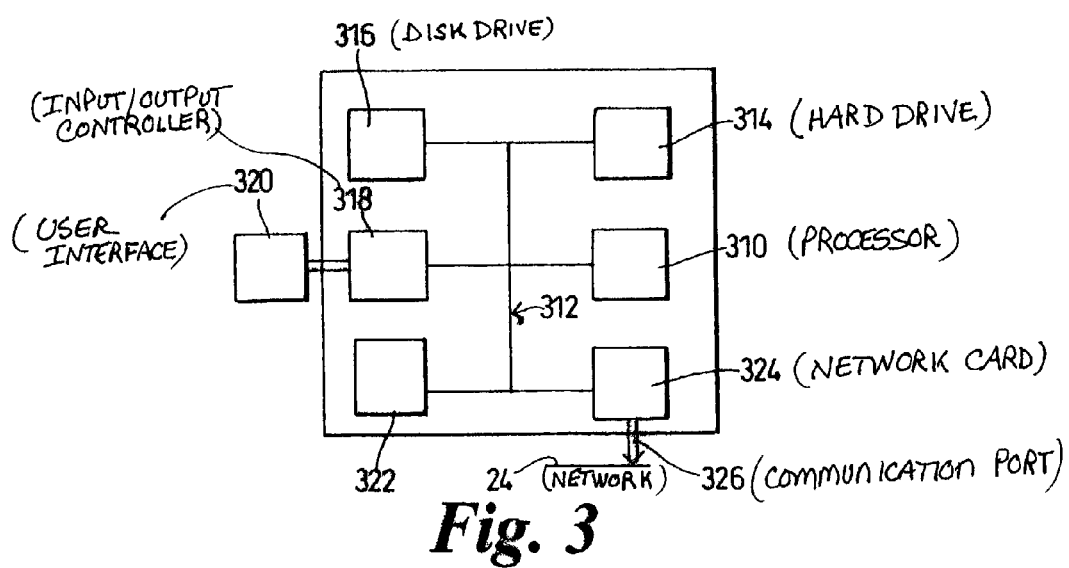
FIG. 3 is a block diagram of a file server suitable for use in the method of FIG. 1.

FIG. 3 is a block diagram of server 30 which in this example is a standard PC running the MS Windows 2000 operating system. The server 30 includes a processor 310 connected via a bus 312 to a hard drive 314, a disk drive 316, an input/output controller 318 for a user interface 320, a RAM 322 and a network card 324 which is also connected via a communications port 326 to a network 24.

Figure 4:
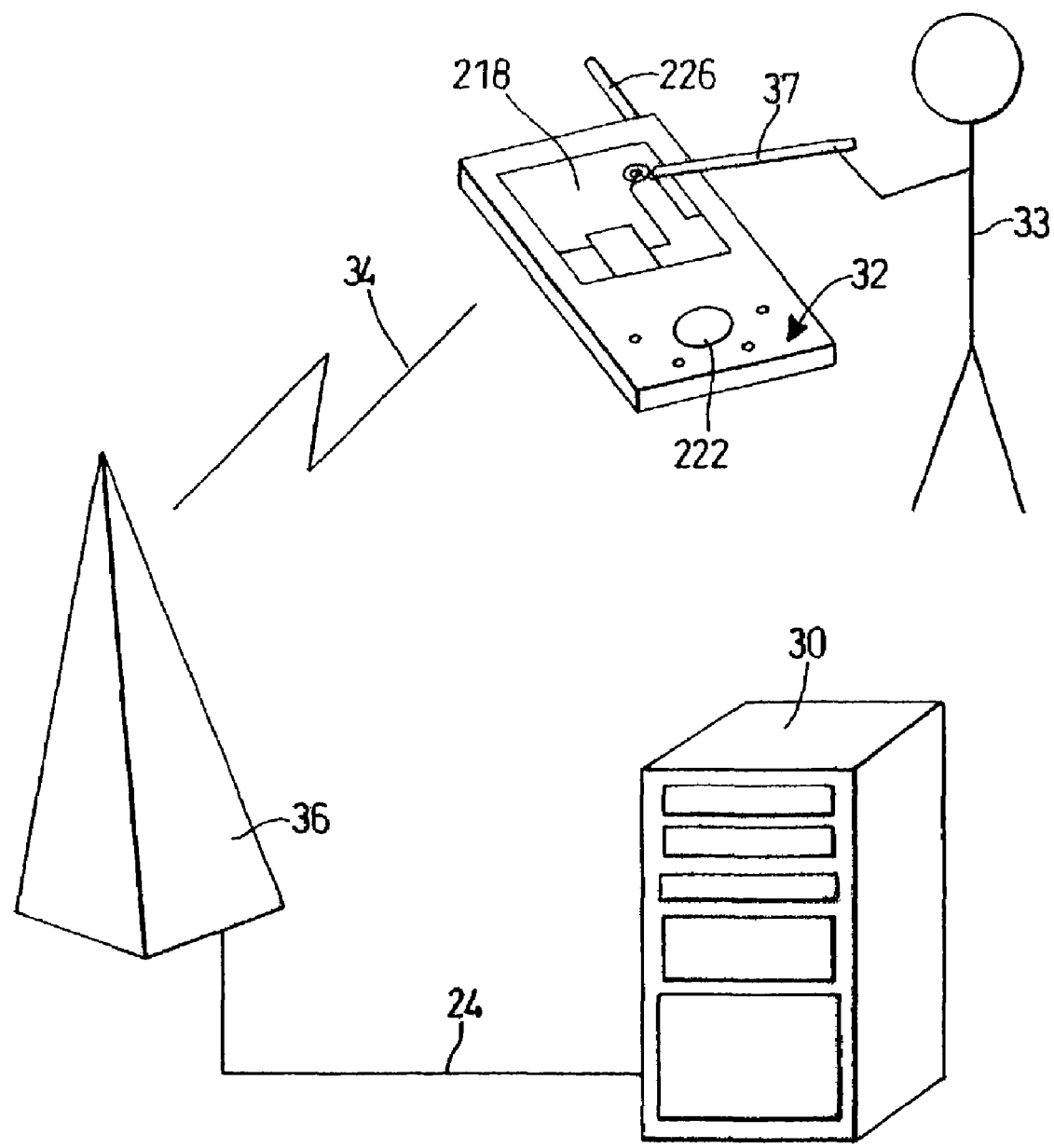
FIG. 4 is a schematic diagram of a system for displaying information stored according to the method of FIG. 1.

Referring to FIG. 4 during use, when the user 33 requests information, the PDA 32 determines its own position and orientation using its GPS system 228 and compass 230 and sends out a positional signal including data indicating the position of the PDA and an orientational signal including data indicating the PDA orientation. These signals are transmitted over a wireless communications link 34, (preferably employing the WiFi 802.11b wireless LAN standard operating at a radio frequency of 2.4 GHz and providing a data rate of up to 11 Mbps) to a network access node in the form of a communications tower 36 which is connected to the network 24. The positional and orientational signals are transmitted over the network 24 to the server 30 which responds by selecting an appropriate marked up panorama image from its library of panorama images and providing a link to it. The PDA 32 then downloads the image 14 that server 30 transmits to the PDA. PDA 32 stores image 14 in its own memory 213 so the user can view image 14 using a panorama browser the PDA stores in its hard drive 214 and which is modified by processor 210 for the orientation and location sensed by GPS system 228 and compass 230. In this case the browser is similar to PhotoVista Panorama.

The panorama browser uses the orientational data provided by the digital compass 230 to determine which part of the selected panorama image should be displayed to the user 33 on the screen 218 so as to give the best correspondence between the pictorial representation as seen on the screen by the user, and the view which the user has of the actual environment where the PDA 32 and the user are situated. It does this by using the orientation of the PDA as an indicator of the orientation of the user, and hence as a means of determining the actual view seen by the user from his current viewing position.

If an image 14 is available of the view from the current position of the PDA 32, or substantially that position, the available pictorial representation is selected as the appropriate image. If a pictorial representation of the current view is not available, then PDA 32 selects the most appropriate pictorial representation. The most appropriate pictorial representation might be the panorama image of the view from the closest possible position to the current position of the PDA. However, in some circumstances the orientation of the PDA is taken into consideration in selecting the appropriate panorama image. For example if the panorama image of the view from the closest position does not include a view of a major feature which the PDA is currently pointing towards, because for example that feature is blocked by another feature, then another panorama image is selected which does include a view of the feature of interest.

Figure 5A:
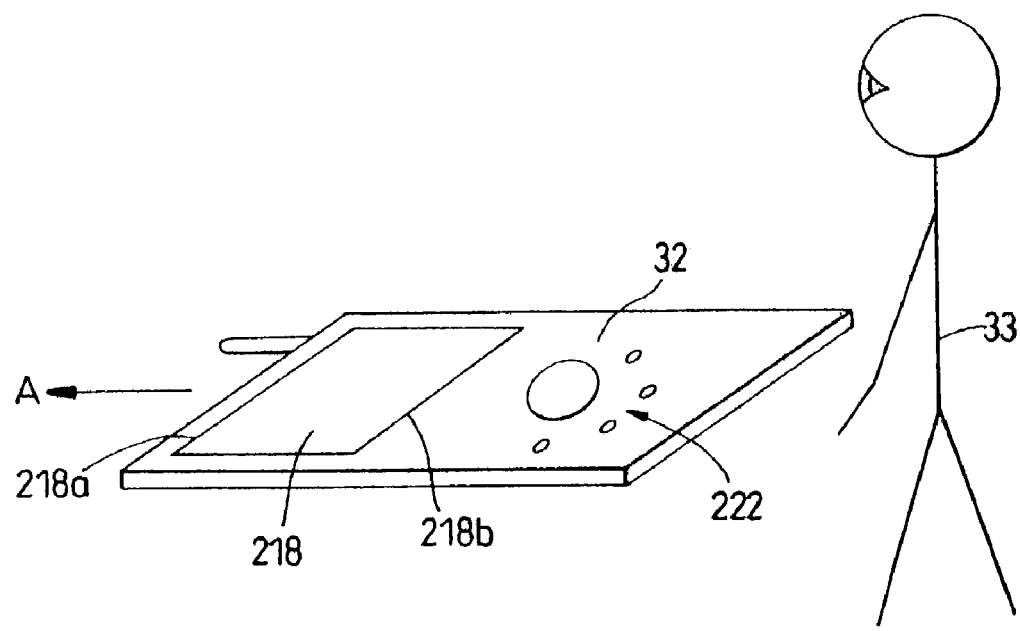
FIGS. 5a and 5b are schematic diagrams of two different orientations of views resulting from use of the device of FIG. 2.
Figure 5B:
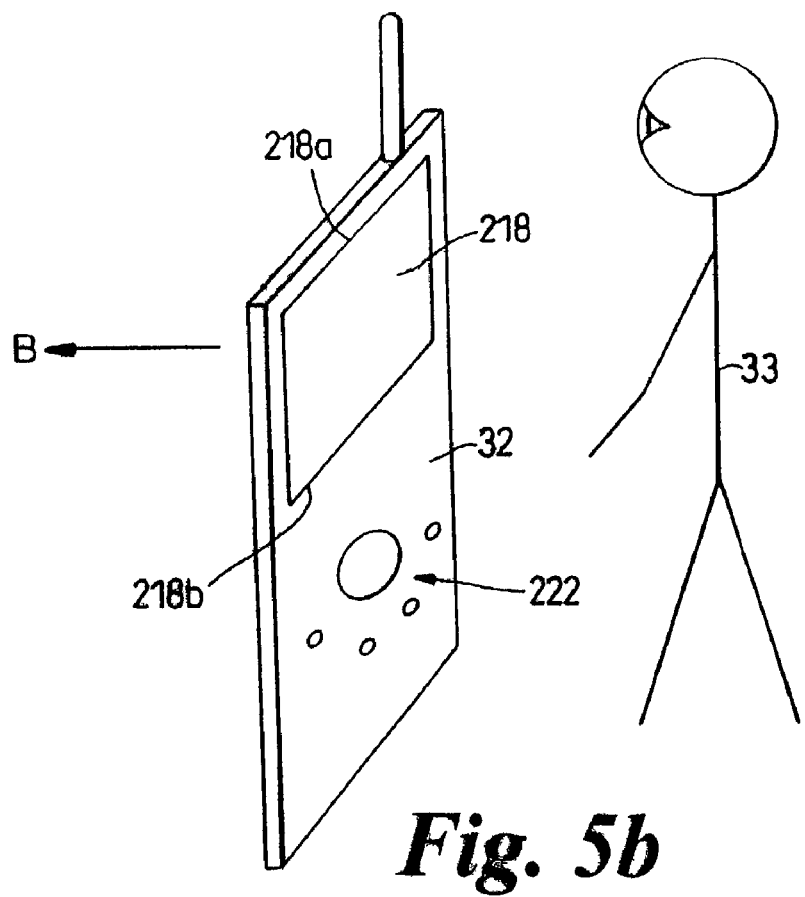

The preferred direction of the view to be displayed to the user 33 is now described by referring to FIGS. 5a and 5b. Generally the screen 218 is substantially flat and has a top edge 218a and a bottom edge 218b. If the PDA 32 is being held by the user 33 in a substantially flat position so that screen 218 is in a substantially horizontal plane, as shown in FIG. 5a, the top edge 218a of the screen 218 is the edge furthest from the user 33 and the bottom edge 218b is the edge closest to the user. If the PDA 32 is held in a substantially vertical plane, as shown in FIG. 5b, the top edge 218a of screen 218 is at the top of the PDA and the bottom edge 218b is at the bottom.

In order to give the best correspondence between the displayed image as seen on the screen 218 by the user 33, and the view the user has of the actual environment, if the PDA 32 is held flat as shown in FIG. 5a, then the view shown on the screen is in the direction of the arrow A, that is in a horizontal direction from the bottom to the top of the screen. Since the user generally holds the PDA 32 in front of him, as illustrated in FIG. 5a, this is the direction the user faces when viewing the PDA. If the user 33 holds PDA 32 in a generally vertical orientation, as shown in FIG. 5b, the view shown on the screen is in the direction of the arrow B which is perpendicular to the plane of the screen, and in the direction in which the rear of the screen, and indeed the rear of the PDA, is facing, i.e. the direction opposite to that in which the screen 218 is facing. If the user 33 is holding the PDA 32 in front of himself, this is the direction in which he will be facing when looking at the screen 218.

The degree to which the PDA 32 can maintain the image in the desired orientation depends in part on the sophistication of the compass 230. If there is only one simple compass which can detect directions in the horizontal plane, then PDA 32 would preferably be set up to achieve the desired image in only one of the situations shown in FIGS. 5a and 5b. However, a more sophisticated compass which can detect or measure changes of direction in a vertical plane could determine the absolute orientation of the PDA 32 and provide the best selection and orientation of the image for all circumstances.

While the user 33 is viewing the panorama image, the PDA 32 continuously monitors its own orientation using the data from the compass 230. If the user rotates the PDA 32, for example because he is turning to look in a different direction, the browser of PDA 32 changes the part of the panorama image displayed on the screen 218 so that the correspondence between the visible part of the image and the direction in which the user 33 is looking is maintained and updated in real time.

The user 33 can also override the automatic direction of the view shown on the screen by using the keypad 222 or the touch sensitive display screen 218 to scroll around through the compass bearings. This enables the user 33 to adjust the viewing direction of the part of the pictorial representation he can see on the screen 218, without actually having to turn himself or the PDA around.

While the image 14 is displayed on the screen 218 of the PDA 32, the image includes hot spots 20 which have been embedded in it. If the user 33 selects one of the hot spots 20 by touching the screen 218, for example, by pressing a pointer 37 against screen 218 at the position of the hot spot 20, an associated link is established via the communications link 34, the network 24 and the server 30, and the connection to the associated web site made, or the associated information displayed. For instance, if the hot spot 20 is associated with a theatre, the user is provided with a web link to the theatre's web site so that the user 33 can obtain information about what is being shown at the theatre, and book tickets on line; if the hot spot 20 is associated with a building, the user is offered a web link to a file stored on the PDA 32 containing information about the building.

Figure 6:
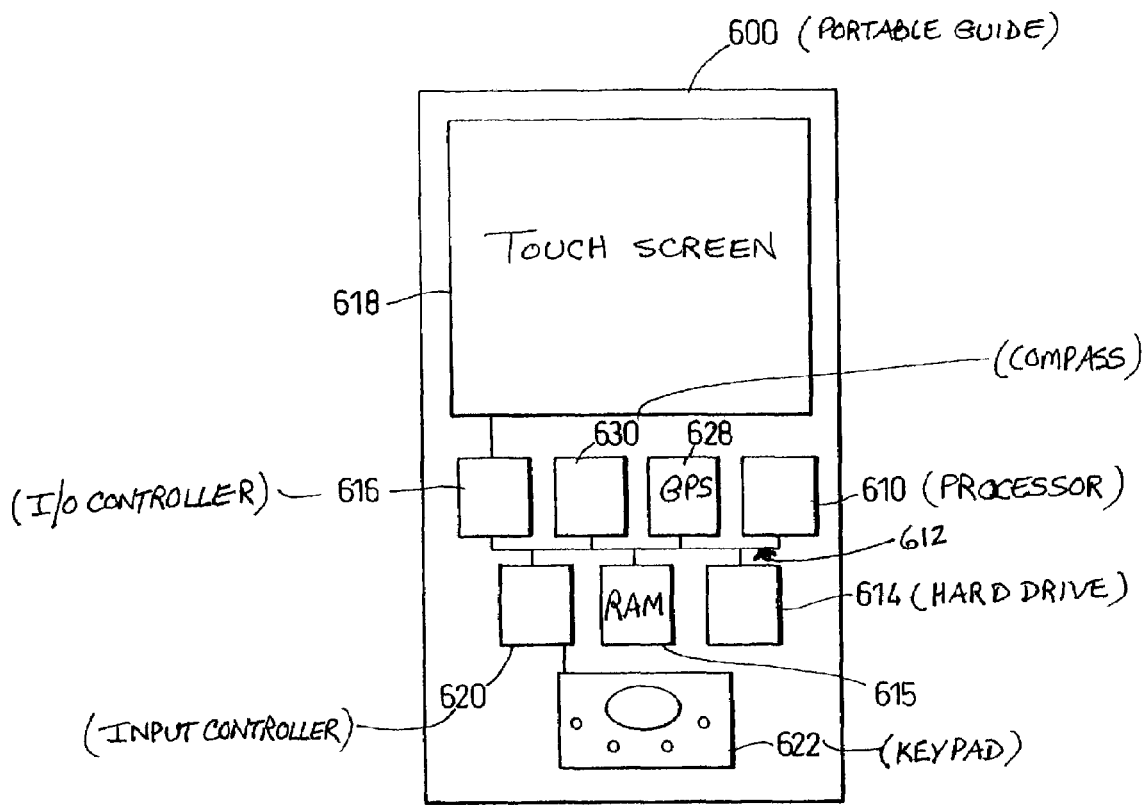
FIG. 6 is a block diagram of a computing device according to a further embodiment of the invention.

A second embodiment of the invention illustrated in FIG. 6 includes a portable computer device having a portable guide 600 for use by tourists. The guide 600 is based on the PDA of FIGS. 2 and 4, and has the same components and structure, but is a self-contained unit that does not form part of a network, and therefore does not have a network card or aerial for wireless communication. The guide 600 therefore comprises a processor 610 connected via a bus 612 to hard drive 614, a RAM 615, an input/output controller 616 connected to a first user interface in the form of a touch sensitive display screen 618, and a further input controller 620 connected to a second user interface in the form of a keypad 622. Also connected to the bus 612 are a GPS receiver 628 and a digital compass 630.

The guide 600 has a number of marked up panoramas stored in hard drive 614 with associated positional and orientational information. When the guide 600 is in use and the user requests a panorama view, the guide processor 610 selects from hard drive 614 the view most appropriate for its current position and displays it on the screen 618, selecting the part of the view for display which is most appropriate for the current orientation of the guide. Also, as with the first embodiment, the guide 600 continuously monitors its own orientation and scrolls round the panorama view to keep the view consistent with its current orientation. Also the user can override the automatic directional control by using the keypad 622 to change the part of the panorama currently visible.

The panorama currently visible on screen 618 includes hot spots as in the first embodiment, but in this case the hot spots provide links to information files stored in hard drive 614 of the guide. Therefore the user can find out detailed information regarding various buildings or monuments in his immediate environment, or about organizations based in the buildings.

What is claimed is:

1. A mobile computing device comprising:
   a controller;
   a display for displaying an image including a pictorial representation of at least a part of a view of a location, the displayed pictorial representation including a visible marker at a predetermined point in the pictorial representation;
   an input device for enabling a user to request information relating to the predetermined point indicated by the visible marker; and
   a locator for deriving data relating to at least one of a current position and a current orientation of the device, the controller being arranged to receive the data and to select the pictorial representation to be displayed at least partly on the basis of the data and for responding to the user request for providing the user with additional information, not in the pictorial representation, relevant to the displayed marker.

2. A device according to claim 1, wherein the controller is arranged to select the pictorial representation to be displayed by selecting one of a plurality of stored images of which the pictorial representation and the marker form at least a part.

3. A device according to claim 1, wherein the controller is arranged to select the pictorial representation and the marker to be displayed by selecting a part of a stored image, including the marker, to form the pictorial representation.

4. A device according to claim 3, wherein a viewing direction is associated with the pictorial representation to be displayed, and the controller is arranged for varying the viewing direction by varying which part of the stored image forms the pictorial representation to be displayed.

5. A device according to claim 1, wherein the controller is arranged to update the pictorial representation to be displayed in real time in response to changes in at least one of said current position and said current orientation.

6. A device according to claim 1, wherein the input device is arranged to enable the user to provide user input indicative of a desired pointing direction of the user, and the controller is arranged to select the pictorial representation to be displayed at least partly on the basis of the user input indicative of the desired pointing direction of the user.

7. A device according to claim 1, further comprising a transmitter for communicating with a remote source.

8. A device according to claim 7, wherein the controller is arranged to retrieve said information from the remote source via the transmitter in response to input to the input device.

9. A device according to claim 7, wherein the controller is arranged to retrieve data for producing the pictorial representation to be displayed from the remote source.

10. A device according to claim 1, wherein the information relevant to a part of the displayed image associated with the hotspot includes services relevant to a specific object at the mark.

11. A device according to claim 10, further including a receiver for a link to a web site for providing the information about the services relevant to the specific object at the mark.

12. A device according to claim 1, wherein the additional information is relevant to an object at the displayed marker.

13. A mobile computing device comprising:
    a controller,
    a display for displaying an image including a pictorial representation of at least a part of a view of a location as seen from a vantage point of the location,
    a user input for enabling a user to request information relating to the location, and
    a data generator for deriving data relating to at least one of a current position and a current orientation of the device, the controller being arranged to receive the data, select the pictorial representation to be displayed at least partly on the basis of the data, and respond to the user input requesting information relating to the location by providing the user with additional information, not in the pictorial representation, about the location.

14. A device according to claim 13, wherein the controller is arranged to select the pictorial representation to be displayed by selecting one of a plurality of stored images of which the pictorial representation to be displayed forms at least a part.

15. A device according to claim 13, wherein the controller is arranged to select the pictorial representation to be displayed by selecting a part of a stored image to form the pictorial representation to be displayed.

16. A device according to claim 15, wherein a viewing direction is associated with the pictorial representation to be displayed, and the controller is arranged for varying the viewing direction by varying which part of the stored image forms the pictorial representation to be displayed.

17. A device according to claim 13, wherein the controller is arranged to update the pictorial representation to be displayed in real time in response to changes in at least one of said current position and said current orientation.

18. A device according to claim 13, including a user interface for enabling the user to provide user input, the controller being arranged to select the pictorial representation to be displayed at least partly on the basis of the user input.

19. A device according to claim 18, wherein the pictorial representation to be displayed includes one or more hotspots, the user input enabling the user to select the hotspot, whereupon information relevant to a part of the displayed image associated with the hotspot is provided to the user.

20. A device according to claim 13, further comprising a communications interface for communicating with a remote source.

21. A device according to claim 20, wherein the controller is arranged to retrieve said information from the remote source via the communications interface in response to an input to the user input.

22. A system for providing information to a user comprising a device according to claim 20 and a data store arranged to store data and forming said remote source.

23. A device according to claim 20, wherein the controller is arranged to retrieve data for producing the pictorial representation to be displayed from the remote source.

24. A device according to claim 13, wherein the pictorial representation is a view from the current position of the device.

25. A system according to claim 22, wherein the data store has a plurality of images stored thereon, each image having an associated indicator relating to at least one of a viewing position and a viewing direction of at least a part of said image.

26. A method of storing data representing a view of a location, the method comprising the steps of:
    recording an image including a pictorial representation of the view as seen from a vantage point of the location,
    associating with the image an indicator of at least one of a location and a direction of the view,
    associating with a part of the image a link to additional information, not in the pictorial representation, relating to a part of the location corresponding to said part of the image, and storing the location and direction of view indicator and the link.

27. A method according to claim 26, wherein the pictorial representation is recorded using a digital camera.

28. A method according to claim 26, wherein the pictorial representation is a panorama image, the indicator is a directional indicator, and the method further comprises associating a part of the panorama image with a direction of a corresponding part of the pictorial representation by using the directional indicator.

29. A method according to claim 26, wherein the indicator is a positional indicator, and the method further comprises associating the pictorial representation with a position from which the view can be seen by using the positional indicator.

30. A file server comprising a memory having stored therein data stored according to claim 26, and a communications port for enabling remote retrieval of said data.

31. A computer-readable product carrying data stored according to the method of claim 26.

32. A method according to claim 26, wherein the information relating to a part of the location is associated with services relevant to a specific object at the part of the location.

33. A method according to claim 32, wherein the information relating to services relevant to the specific object at the part of the location is recorded in response to a transmission from a web site.

34. A method of providing information to a user via a mobile computing device, the method comprising:
receiving data relating to at least one of a current position and a current orientation of the device;
selecting an image including a pictorial representation of a view of a location, the image being selected at least partly on the basis of said data; and
presenting the pictorial representation to the user of the device and responding to an input of the user about the pictorial representation by providing the user with at least one link to additional information, not in the pictorial representation, relating to the location.

35. A method according to claim 34, wherein the device includes a screen, and the method further includes presenting the pictorial representation on the screen.

36. A computer-readable product carrying instructions which, when run on a computing device, cause the computing device to perform the method of claim 34.

37. A method according to claim 34, wherein the pictorial representation includes a hotspot object, and the method further includes presenting to the user additional information, not in the pictorial representation, concerning the hotspot object in response to the user selecting the hotspot object.

38. A method according to claim 37, wherein the information concerning the hotspot object includes services relevant to the hotspot object.

39. A method of providing information about a location to a user via a mobile computing device, the method comprising:
receiving data relating to at least one of a position and an orientation of the device relative to a vantage point of a view of the location,
selecting an image including a pictorial representation of a view of the location from the vantage point of the location, the image being selected at least partly on the basis of said data, and
presenting to the user of the device the pictorial representation and at least one link to additional information, not in the pictorial representation, relating to the location.

40. A method according to claim 39, further including obtaining the additional information by the user accessing the presented link.

41. A mobile computing device comprising:
a controller,
a display for displaying an image including a pictorial representation of at least a part of a view of a location as seen from a vantage point of the location,
an input device for enabling a user to request information relating to the location, and
a locator for deriving data relating to the location based on the appearance of the location from the vantage point, the controller being arranged to receive the data and to select the pictorial representation to be displayed at least partly on the basis of the data and to respond to an input by a user of the device by providing to the user additional information, not included in the pictorial representation, about at least a portion of the pictorial representation.

42. A mobile computing device comprising:
a controller,
a display for displaying an image including a pictorial representation of at least a part of a view of a location as seen from a vantage point of the location,
a user input for enabling a user to request information relating to the location, and
a data generator for deriving data relating to the location based on the appearance of the location from the vantage point, the controller being arranged to (a) receive data, (b) select the pictorial representation to be displayed at least partly on the basis of the data, and (c) respond to a request by the user by providing the user with additional information, not in the pictorial representation, about at least a portion of the pictorial representation.

43. A method of storing data representing a view of a location, the method comprising the steps of:
recording an image including a pictorial representation of the view as seen from a vantage point of the location;
associating with the image an indicator of at least one of a location and a direction of the view as seen from the vantage point;
associating with a part of the image a link to additional information, not in the pictorial representation, relating to a part of the location corresponding to said part of the image; and
storing the location and direction of view indicator and the link.

* * * * *